US008327435B2

(12) United States Patent
Bogineni et al.

(10) Patent No.: US 8,327,435 B2
(45) Date of Patent: *Dec. 4, 2012

(54) TECHNIQUES FOR MANAGING SECURITY IN NEXT GENERATION COMMUNICATION NETWORKS

(75) Inventors: Kalyani Bogineni, Hillsborough, NJ (US); Gerard J. Flynn, Washington, NJ (US); William H. Stone, Jr., Doylestown, PA (US); Edward A. Salas, Tewksbury, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/087,880

(22) Filed: Apr. 15, 2011

(65) Prior Publication Data

US 2011/0191844 A1     Aug. 4, 2011

Related U.S. Application Data

(63) Continuation of application No. 11/637,697, filed on Dec. 13, 2006, now Pat. No. 7,950,045.

(51) Int. Cl.
*G06F 9/00* (2006.01)
(52) U.S. Cl. ............... 726/12; 726/22; 726/26; 713/151; 713/153; 713/168
(58) Field of Classification Search .................. None
See application file for complete search history.

(56) References Cited

U.S. PATENT DOCUMENTS

| 6,061,797 A | 5/2000 | Jade et al. |
| 6,873,988 B2 | 3/2005 | Herrmann et al. |
| 2005/0254652 A1* | 11/2005 | Engler et al. ........... 380/270 |
| 2005/0273850 A1* | 12/2005 | Freund .................... 726/14 |
| 2006/0085543 A1 | 4/2006 | Hrastar et al. |
| 2006/0218395 A1* | 9/2006 | Maes ....................... 713/167 |
| 2007/0044141 A1 | 2/2007 | Lor et al. |
| 2007/0100981 A1* | 5/2007 | Adamczyk et al. ...... 709/223 |
| 2007/0143824 A1 | 6/2007 | Shahbazi |
| 2007/0143827 A1 | 6/2007 | Nicodemus et al. |

OTHER PUBLICATIONS

CISCO, "Enterprise Layer 3 Mobility Solutions—Using CISCO Mobile IP Zero Configuration Clent" 2005, pp. 1-19.*
ISCO, "Preventing worm and virus outbreaks with CISCO self-defending networks", white paper, CISCO Inc., 2004, pp. 1-5.*
U.S. Appl. No. 11/485,991, filed Jul. 14, 2006, Kalyani Bogineni, et al.
The International Search Report and the Written Opinion of the International Searching Authority issued in Patent Application No. PCT/US07/20718 dated on Jul. 14, 2008.
CISCO, "Preventing worm and virus outbreaks with CISCO self-defending networks", white paper, CISCO Inc., 2004, pp. 1-5.
Entire Prosecution of U.S. Appl. No. 11/637,697 to Bogineni, et al., filed Dec. 13, 2006, entitled "Techniques for Managing Security in Next Generation Communication Networks".
Entire Prosecution of U.S. Appl. No. 11/485,991 to Bogineni, et al., filed Jul. 14, 2006, entitled "Multimedia next generation network architecture for IP services delivery based on network and user policy".

* cited by examiner

*Primary Examiner* — Shewaye Gelagay

(57) ABSTRACT

Disclosed techniques provide enhanced security for a communications network. Access terminal devices intended for operation via the network are expected to have security agent functionality, e.g. in the form security agent software loaded into or otherwise enabled on each of the access terminal devices. Registration procedures include verification that such an agent is present/enabled on an access terminal and that the agent currently implemented on the terminal device provides adequate security for the communications network against malicious traffic from that device.

11 Claims, 6 Drawing Sheets

TECHNIQUES FOR MANAGING SECURITY IN NEXT GENERATION COMMUNICATION NETWORKS

RELATED APPLICATIONS

This application is a Continuation of U.S. patent application Ser. No. 11/637,697, filed on Dec. 13, 2006 now U.S. Pat. No. 7,950,045, which is related to U.S. patent application Ser. No. 11/485,991 Filed Jul. 14, 2006, by inventors Kalyani Bogineni, Gerard J. Flynn, William H. Stone, Jr., Edward A. Salas, entitled "Multimedia next generation network architecture for IP services delivery based on network and user policy," the disclosures of each of which are also entirely incorporated herein by reference.

TECHNICAL FIELD

The disclosure herein relates to improved security across layers and paths of a native packet communication network, based on network management of security functions of the access terminal device, such as might be used in a next generation network deployment for wireless communication services.

BACKGROUND

Communication networks are undergoing a rapid evolution from circuit switched technologies, originally developed for voice communications to packet switched technologies. The packet technologies were originally developed for data communications, but as speed has increased and the technologies have evolved, the packet networks have been able to provide generic transport for all forms of information (voice, video, multimedia, text, etc.). Next generation networks will provide end-to-end packet transport, typically, based on Internet Protocol (IP) packets. However, as more and more communication applications have migrated to packet transport that was often intended for an open Internet application, they have become subject to many of the security issues that plague the public Internet, hacking, security, information theft, identity theft, etc. Hence, security is a significant concern.

Existing mechanisms address security in a layered approach—at link layer, at network layer, and at the application layer—and at many points in the end-to-end path of service delivery. This is not very efficient in terms of network resources and in terms of performance of latency-constrained applications. A need exists for an enhanced technique for providing security in a native packet network offering a wide range of communication service applications, particularly one that is efficient to implement and scale from the perspective of the network operator.

SUMMARY

The technology disclosed herein therefor provides enhanced security for a communications network. Access terminal devices intended for operation via the network are expected to have security agent functionality, e.g. in the form of security agent software loaded into or otherwise enabled on the access terminal devices. Techniques disclosed herein relate to operations of an access terminal device and/or a node of the communications network to check the access terminal device with respect to the security agent functionality before permitting network registration of the device and thus before the network provides communication service to the access terminal device.

From a network element perspective, such a technique might involve receiving a message relating to a request for registration of an access terminal device for service through the communications network. In response to information of the message, a determination is made as to whether or not the access terminal device is implementing a security agent which is adequate to protect the communications network against malicious traffic. If the access terminal device is implementing an adequate security agent, the network authenticates the access terminal device for the service through the communications network.

From an access terminal device perspective, a security methodology might involve sending a message relating to a request for registration of the access terminal device for service through the communications network, to a node of the communications network. The message includes data regarding any security agent enabled in the access terminal device. If the communications network grants the requested registration, in response to the data regarding the enabled security agent, the access terminal device communicates through the network. During such communication through the network, however, the security agent in the device functions to prevent the access terminal device from sending malicious traffic into the communications network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
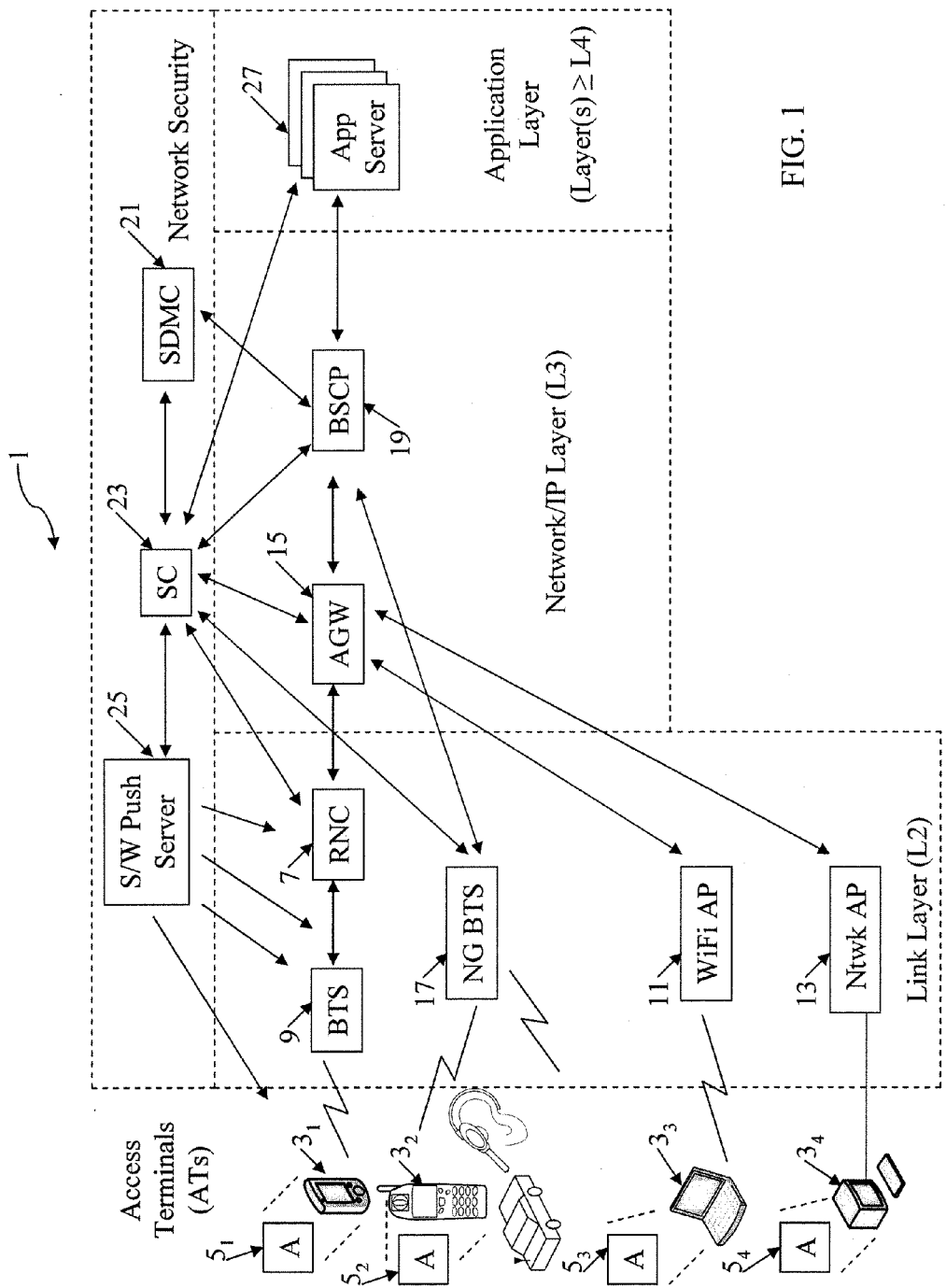
FIG. 1 is a block diagram of a network architecture, which implements the security procedures discussed herein.

Methods and equipment are disclosed for implementing security mechanisms in a comprehensive way that uses network resources efficiently and allows the network to deliver services that meet customer expectations. Security Agents are implemented in the access terminal devices, to insure secure network operations; and network elements enforce related security policies, e.g. including confirming that a particular access terminal device seeking service via the network is running an appropriate Security Agent. Aspects of the security technology may be implemented in a variety of different networks. However, the technology may be particularly advantageous in a next generation internet protocol (IP) network that offers packet transport for voice, data and multimedia services for wireless and/or wireline access terminal devices. Hence, to facilitate understanding of the security technologies, it may be helpful to discuss an exemplary communications network 1 as shown in FIG. 1 and the implementation of the security technologies in the context of that network, FIG. 1 provides a high level functional illustration of generic network elements, which are relevant to the present discussion. For additional information regarding the illustrated elements and other elements of such a network, attention may be directed to the above-incorporated U.S. patent application Ser. No. 11/485,991.

The drawing shows a number of Access Terminals (ATs) 3. In general, an AT 3 may be any device having data communication capabilities compatible with the access network technology of the particular network. The drawings show several ATs by way of example. A first AT device is represented by a personal digital assistant (PDA) $3_1$. A second illustrated example of an AT device is represented by a wireless mobile telephone station $3_2$ in the form of a handset. Wireless communication equipment is often incorporated into handheld or laptop type personal computers (PCs), as represented in the example by the laptop PC $3_3$ with Wi-Fi communication capability. Of course those skilled in the art will recognize that the ATs may be personal devices like wearable devices represented generally by an earpiece or headset type mobile station in the drawing; or the ATs may be vehicular devices, as represented generally by the automobile having a mobile station in the drawing. A variety of other AT configurations are possible, for any of the wireless ATs $3_1$ to $3_3$. The network 1 may also provide wireline data communication services to devices having wireline packet data communication capabilities, as represented by the desktop PC $3_4$ in the example. As used herein, the term "wireline" encompasses any hard cable media, be it copper pair wiring, coaxial cable, optical fiber or the like.

In the example discussed herein, the AT devices 3 have communication capabilities that support voice and/or data service applications for multimedia applications or the like. Many of the communications under discussion here utilize end to end packet transport through the network, both for bearer traffic and for signaling, including signaling related to the various security mechanisms.

Each AT 3 runs software implementing a Security Agent (A) 5, which performs a variety of security related functions. Hence, the PDA $3_1$ runs a Security Agent (A) $5_1$, whereas the mobile station type AT $3_2$ runs a Security Agent (A) $5_2$. Similarly, communication equipment in the laptop PC $3_3$ runs a Security Agent (A) $5_3$, whereas the communication equipment in the wireline connected desktop PC $3_4$ runs a Security Agent (A) $5_4$. As discussed more below, many of the features of the Security Agent (A) 5 relate to protection of the network and/or other users of the network from malicious operation of the AT 3. A portion of the AT Security Agent (A) 5 works in conjunction with the network to ensure that the right security mechanisms are in place. Also there is software in the AT Security Agent (A) 5 to monitor the activity on the AT 3 and to prevent any malicious traffic entering the network.

A Multimedia Next Generation Network architecture disclosed herein, with the associated security features, covers the entire next generation system for a wide range of communication services, including application, signaling and bearer functionalities. The examples represent a packet switching network that provides voice, video, multimedia and other data services for subscribers' access terminals (ATs) 3, using packet switched transport, typically using IP packets and associated protocols. An Access Network (AN) comprises the physical network elements providing layer 1 and layer 2 transport of the packet communications of the AT. The AN may use wireline/landline technologies for the link layer (L2) of the network 1. Also, the AN may use a wireless termination system and the edge IP system. The AN and AT together implement link layer security. This also implements origination/termination points of security on downlink/uplink directions of untrusted access networks.

For ATs $3_1$ to $3_3$ receiving service over a wireless air link interface, the network 1 includes one or more wireless network segments referred to as radio access networks (RANs). A RAN provides wireless communication with users' ATs, in this case by providing layer one and layer two transport of IP packets over the air link to/from the ATs 3 operating in areas that the particular RAN services. A variety of RAN technologies are known and/or being deployed. The network 1 may use one or more such technologies, and the architecture diagram of FIG. 1 shows three different RAN implementations by way of example. The network 1 may also support wireline access. The Network/IP packet layer (L3) provides a common interface between the higher layer elements (L4 and above) and the layer one (L1) and layer two (L2) elements of the access networks.

A Base Terminating Station (BTS) provides two-way packet communication over the air link interface with one or more of the wireless ATs. In some RANs, such as those based on the 1xRTT model, the RAN also includes a radio network controller RNC 7 for control of one or more of the BTS units 9. In the example, the PDA $3_1$ is configured for wireless communication via the BTS 9, although in an actual network many other ATs of various types would be configured for such wireless communications. Another option is for certain types of ATs to communicate using wireless Ethernet (IEEE 802.11) with a Wireless Fidelity (Wi-Fi) access point (AP) 11. In the example, the laptop PC $3_3$ is configured for wireless Ethernet type communication via the Wi-Fi AP 11, although in an actual network other ATs of various types might be configured for such wireless communications. For wireline service, the link layer of the network also provides one or more network access points (Ntwk AP) 13. A variety of different types of Ntwk APs 13 may be used to provide this network connectivity, depending on the particular type of physical media used for the wireline/landline connection, e.g. dial-up modem, digital subscriber line over twisted copper pair, cable modem over hybrid-fiber-coax cable television networking, optical fiber to the home or curb, etc. In the example, the desktop PC $3_4$ is configured for wireline communication via the Ntwk AP 13, although typically many devices of various types would be configured for use of that access technology. For the access technologies 7-13, the network 1 includes an Access Gateway (AGW) 15 for routing subscribers' communication packets and implementing a number of layer three (L3) functions, as discussed in more detail in the above-incorporated Ser. No. 11/485,991 application.

An alternative RAN implementation might utilize an IP capable BTS, referred to in the drawing as a next generation (NG) BTS 17, having incorporated therein a router and layer three (L3) functions similar to several of the functions of the AGW. Although shown in the link layer (L2) for convenience, the NG BTS 17 also performs a number of network/IP layer (L3) functions and as such overlaps the L2 and L3 layers of the network 1. Such an NG BTS 17 does not require a separate gateway but instead communicates directly with several other elements of the network 1.

A Bearer Services Control Point (BSCP) 19 provides layer three (L3) control of subscribers' packet communications, for voice, video, and data oriented services through the network 1. The BSCP 19 is a single point of network and user control for policy management, bearer facilities management, mobility management, charging, and security, for IP Multimedia Subsystem or "IMS" services (SIP based) and for non-IMS services (not based on SIP).

There are two IP connection points or scenarios in the network 1:

1) Between the Operator IP network 1 and other managed IP networks/public Internet; and
2) Between various access network technologies and the Operator IP network 1.

The BSCP 19 is the first Operator network element in Scenario 1. It is the IP interface to other IP networks (not shown) for bearer traffic, and is the control point for all download traffic coming into the Operator network 1 from the other IP networks. The AGW 15 or the NG BTS 17 is the first L3 network element in Scenario 2. The AGW 15 provides the IP interface to the transport layer elements, for AT communications via an RNC 7 and BTS 9, for AT communications via a Wi-Fi AP 11, and/or for AT communications via a Ntwk AP 13. The NG BTS 17 provides the IP interface to the transport layer elements, for AT communications through the NG BTS 17. The AGW 15 or the NG BTS 17 needs to enforce all the applicable IP layer functions to upload traffic. The BSCP 19 controls all resources in conjunction with the NG BTS 17, for both uplink and downlink traffic.

A Services Data Management Center (SDMC) 21 provides for a unified subscriber database for all services for all devices, as well as authorization and accounting information, for any IMS or non-IMS services hosted by the network Operator. The SDMC 21, for example, may be implemented by a subscriber service database (SDB), an authorization and accounting (AA) server and a user policy server, running on one or more computer platforms coupled for secure IP communication with other nodes/elements of the network 1.

The SDMC 21 is the central repository of all subscriber information (ex. all 40-50 services that a subscriber may subscribe to, for all 100M subscribers of the Operator of the network 1). This can be deployed in central locations like the Data Centers in a highly available architecture. This can be implemented on a general-purpose database such that the network Operator can add fields to the profile of each subscriber device, without going through an integration project for every service rolled out. The SDMC 21 can be deployed in a replicated (non-partitioned) mode—all instances of SDMC 21 will have information for all subscribers similar to today's authentication, authorization and accounting (AAA) database deployment, or can be deployed in a partitioned mode similar to today's home location register (HLR) deployments. Appropriate database synchronization mechanisms will be implemented by the Operator.

The SDMC 21 also supports authorization and accounting functions. All charging records from the BSCP 19 and the application layer elements are stored here to be forwarded to network operator Billing systems (not shown). The SDMC 21 also has interfaces to the Provisioning systems (not shown).

The SDMC 21 also serves as the equipment identity register (EIR), which is the functional entity that represents the database repository for mobile equipment-related data. An example of such data is the Electronic Serial Numbers (ESN) of mobile equipment or similar identifiers of other types of ATs along with the features and status of that equipment. Such a database could assist in preventing stolen or fraudulent equipment from being used to access network services as well as in providing push services.

A Security Center (SC) 23 is the central repository for all security related databases and functions. The SC disclosed herein implements security mechanisms for next generation wireless/wireline networks in a comprehensive way that uses network resources efficiently in both uplink and downlink directions and also delivers services that meet customer expectations. Security is enforced by monitoring and using network policies at various points in the network such that users as well as the network are protected. The matrix approach addresses security at link layer, network layer, and application layer as well as addressing security in the access terminal, airlink/IP edge network element and IP border network element.

The SC 23, for example, provides:

A mechanism for comprehensive implementation of user, services and network security to protect both user and the operator network;

Dynamic operator security policy decision and enforcement to utilize resources efficiently and to deliver services with best user experience;

Intelligence in network elements like a security center, a bearer services control point, and the user's access terminal, prior to enforcing multi-layer encryption mechanisms; and Tying inter-operator relationships to develop network intelligence for service delivery via the security center and the bearer services control point.

In one possible implementation, the SC 23 comprises a Key Distribution Center (KDC) for security key storage and distribution and an associated security server. The SC 23 for example may be implemented by appropriate software running on one or more computer platforms coupled for secure IP communication with other nodes/elements of the network 1. The SC 23 implements the authentication, encryption and other network, services, and device related security functions. The SC 23 is the centralized repository of all security related information. Layer two, layer three, and application layer authentication and encryption keys are all held here in the KDC. All the inter-network element encryption and authentication keys are also held here. DRM keys for network Operator hosted content will also be held here. This database is used to support all security functions of the network Operator. As will be apparent from the later discussion, the AT authentication functions of the SC 23 also involve a confirmation that each AT 3 is currently implementing appropriate software for the Security Agent (A) 5.

For AT devices 3 of customers of the Operator of network 1, the network may also implement a mechanism to update or otherwise upgrade the Security Agent software. Software push mechanisms are known today. The drawing shows an example of a software (S/W) push server 25. As represented by the arrows, the server 25 may be activated by the SC 23, and the server 25 is capable of transmission of at least Security Agent software to the various ATs 3 via the respective AN nodes. In the illustrated network, the SC 23 would interact with such a server 25 or the like to push an update or upgraded software to an AT device 3 of a customer of the Operator, when the SC 23 determines that the resident version of the Security Agent software is outdated and a newer update or upgraded version, e.g. to enhance network security, is available. A similar procedure can be used to download Security Agent software to an AT device that does not yet have an agent.

The disclosed architecture is access agnostic. A packet switching implementation of such a network 1, for example, will provide voice, video, and data oriented services over a wireless air link interface, for subscribers' access terminals (ATs) using RAN access technologies 7, 9, 11 and 17. The network 1 will also provide such services over wireline interfaces represented generically by the Ntwk AP 13. The common point is the network IP layer (L3), and the network architecture is valid for any access technology below the IP layer. Application servers 27 are network entities that provide supplementary services using communications through the network 1. In terms of the protocol stack, the application layer functions are those logically operating above layer three (L3), that is to say at or above layer four (L4). The illustrated servers 27 in the network 1 provide services hosted by the network Operator. Although not shown, other application service providers would operate other servers, which have IP packet connectivity to the L3 layer of the network 1.

From the above discussion, those skilled in the art will recognize that the security techniques discussed herein may be applicable to a variety of different network architectures, both for fixed wire-line services and for wireless services. With that overview, it should be apparent that the network utilizes a Database (DB), e.g. in the SC 23, which contains device, user, and application authentication and encryption information. As services manager such as the BSCP implements network layer security. Application Servers (AS) connect to the network for implementing application layer functions, including application layer security mechanisms. Of note, the SC 23 also verifies security agent functions of the ATs 3, which attempt to register for service through the network 1.

In operation, when the AT 3 is detected on the network 1, it is authenticated at the link layer (L2) by the AN. Registration proceeds to the L3 layer. As part of one of these registration steps (at L3 in the example), the SC 23 checks for an adequate Security Agent 5 on the particular AT 3. If the SC 23 does not detect the right software on the AT 3, the right software maybe pushed to the particular AT from the server 25. The AT and AN are in constant communication such that security violations from the AT side are prevented. The BSCP 19, acting as the services manager, authenticates the user at the network layer (L3). Once network layer authentication is done, the software on the AT pro-actively monitors activity such that malicious traffic is prevented from entering the network 1. The Application Server 27 authenticates the user subscription at the time of service request. Where the application is hosted by the network Operator or a partner, the SC 23 may also help in the application layer authentication.

It is assumed that those skilled in the art are familiar with the structure and operation of the AT devices 3. The discussion herein focuses on security technologies, including a Security Agent implemented in each of the AT devices 3. Enforcement of security requirements entails communications with the AT devices, and in some cases, downloading an update or upgraded version of the Security Agent programming for loading into and execution in the AT devices 3. To insure a full understanding by all readers, it may be helpful to consider a high level summary review of the relevant structure of one example of an AT device, in this case, the mobile station AT $3_2$.

Figure 2:
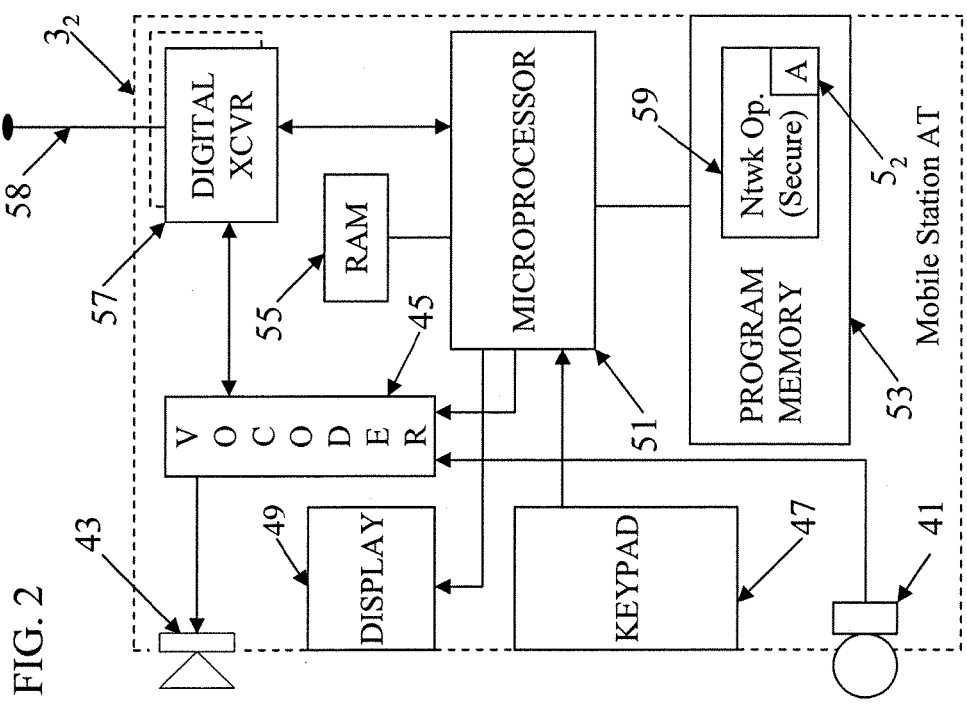
FIG. 2 is a functional block diagram of hardware of a mobile station implementation of an access terminal device that may operate in the network of FIG. 1.

FIG. 2 is a functional block diagram illustrating a digital telephone implementation of the mobile station $3_2$. The PDA mobile station $3_1$ may have a similar structure, although some PDAs lack the elements for voice communication and instead will utilize different user interface (input/output) elements and may have more processing and memory capacity. Although the station $3_2$ may be incorporated into a vehicle mounted mobile unit or into another device, such as a portable personal computer or PDA, for discussion purposes the illustrations show the station $3_2$ in the form of a handset.

The handset embodiment of the mobile station AT $3_2$ functions as a normal digital wireless telephone station. For that function, the station $3_2$ includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset $3_2$ also includes a digital transceiver (XCVR) 57, in this case, compatible with digital wireless packet communications with the NG BTS 17 and/or with a BTS 9 and RNC 7. The concepts discussed here encompass embodiments of the station $3_2$ utilizing any digital transceivers that conform to current or future developed digital wireless communication standards. For example, the transceiver 57 could be a CDMA-2000, 1xRTT, or EVDO unit or the like designed for cellular or PCS operation or for WiFi/WLAN. The transceiver 57 provides two-way wireless communication of information, such as vocoded speech samples and digital message information. If compatible with the BTS 9, the communications via the transceiver could include both cellular digital voice and packet data communications. Via the NG BTS 17, the communications via the transceiver 57 all utilize IP packet transport. The transceiver also sends and receives a variety of signaling messages in support of the various services provided via the station $3_2$ and the network 1. The transceiver 57 connects through RF send and receive amplifiers (not separately shown) to an antenna 58. The station $3_2$ may include one or more additional transceivers, as shown in dotted line form, for operation in accord with an alternative digital standard.

As shown, the digital telephone handset $3_2$ includes a display 49 for displaying messages a menu generated by a client browser program or the like, call related information dialed and calling party numbers, etc. A keypad 47 enables dialing digits for voice and/or data calls and generating selection inputs keyed by the user based on the displayed menu. These elements are also used for display of menus and other information to the user and user input of selections, for various applications that involve the AT and/or communications of the AT through the network 1. Of course other user interface elements may be used, such as a stylus and touch sensitive display screen, as in a PDA.

A microprocessor 51 controls all operations of the mobile station AT $3_2$. The microprocessor 51 is a programmable device. The mobile unit $3_2$ also includes flash type program memory 53 and/or a non-volatile random access memory (RAM) 55, for storing various software routines and mobile configuration settings, such as mobile identification number (MIN), etc. The program memory 53, for example, may store an operating system, vocoder software, client browser software, device driver software, call processing software, an IP protocol stack, etc. However, the program memory 53 will also include some storage dedicated to programming 59 of the Operator of the network 1, which implements or includes the Security Agent (A) software $5_2$. The storage for the Operator programming 59 will be secure, so that the programming 59 can not be modified except by secure elements of the network 1 or by personnel of the network Operator. The network Operator software 59 may implement any number of functions in relation to control of AT communications through the network 1. As discussed more later, the stored software 59 will include the software implementing the security functionalities, specifically including the network Security Agent 5. The memories also store data, such as telephone numbers, server addresses and data input by the user via the keypad 47.

The structure and operation of the mobile station $3_2$, as outlined above, were described to by way of example, only.

Figure 3:
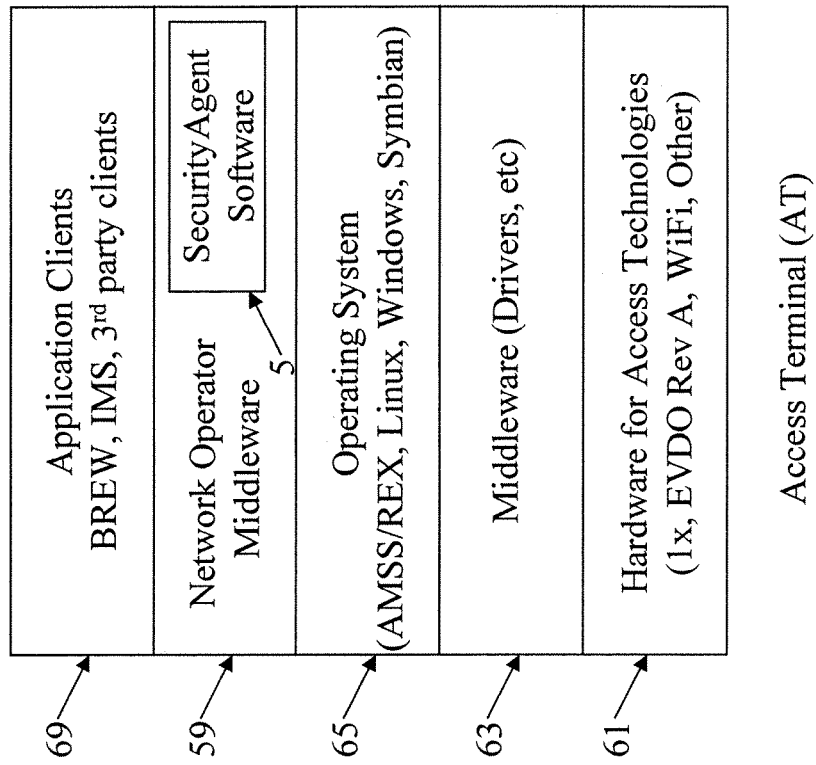
FIG. 3 is an alternate block diagram, which shows the functional hierarchy, particularly the hierarchy of the software implemented in the access terminal device.

FIG. 3 shows an alternate representation of an AT device 3, with more emphasis on the software hierarchy. In the representation of FIG. 3, the hardware 61 appears as the lowest layer functionality. The hardware for the network access technologies may be Wi-Fi or any of the available wireline technologies, or the hardware may utilize any wireless technology such as 1x or EVDO Rev A type implementations of the mobile station $3_2$, in a manner analogous to FIG. 2. The AT will store the software implementing the functions of the other layers. For example, in the mobile station $3_2$, the program memory 53 stores software components corresponding to the higher layers illustrated in FIG. 3.

As shown in FIG. 3, the software for the AT 3 will include a first layer 63 of middleware for providing interfaces between the higher layer functions and the particular hardware of the AT 3. For example, this layer 63 will include device drivers for allowing the device processor to control the particular communications hardware, user interface elements, etc. On top of the middleware layer 63 containing the device drivers, the AT 3 will run an operating system 65. Examples of current operating systems include AMSS/REX, Linux, Windows and Symbian.

As outlined earlier, each AT 3 of a customer of the network Operator will also run as least some software 59 for that Operator's network 1. In the illustrated hierarchy, the network Operator's software 59 is another middleware layer, of a type that runs on top of the operating system 65 but below the application layer. Of particular note, the network Operator's software 59 includes at least a portion that specifically implements the Security Agent 5. The Security Agent software 5 typically includes executable programming code and/or data to be used in implementing one or more security functions.

On top of the network Operator's software layer 59, the AT 3 runs one or more client applications 69. In the mobile network environment, the applications may be BREW or IMS type applications or any number of other third party applications that utilize the hardware and communication functionalities of the AT 3. The network Operator's software 59 implements an application program interface (API) that is published to the application software developers. The API provides a standard interface for communications between the applications at layer 69 and the middleware of the network Operator's software 59 and thus with the lower layers of the software and hardware of the AT.

Because the applications layer 69 runs on top of the network Operator's software 59 that contains the Security Agent 5, all communications from the application layer 69 go through the Security Agent 5. Incoming traffic may also go through the Security Agent 5, before delivery to the appropriate application in layer 69. In this way, it is possible for the Security Agent 5 to examine all outgoing traffic (and possibly incoming traffic), compare the traffic to parameters/patterns of acceptable or unacceptable traffic and filter out any communications deemed harmful or malicious. There are many kinds of threats. The Security Agent software would include a list of threats, respective characteristics of applications or applications traffic for use in identifying threats, and appropriate mechanisms to prevent such threats propagating harmful traffic from the AT device 3 into the network 1. In this way, the Security Agent 5 will act as a reverse firewall to block communications from any of the applications in layer 69 that are deemed potentially harmful and/or to filter out any types or patterns of traffic deemed potentially harmful, based on the network Operator's security criteria.

For example, the Security Agent software 5 will collect credentials from the application clients in software layer 69. Some application credentials may be identified as anti-network or spyware or the like, in which case, the Security Agent software 5 would reject or block all communications to or from the respective application client.

As another example, the Security Agent software 5 will also filter traffic from the applications at layer 69, based on traffic characteristics or patterns. For example, if the Security Agent software 5 detects that an application is sending the same message to an excessive number of addresses (spam) or that an application is sending an excessive amount of IP traffic to one address (denial of service attack), it can block further outgoing traffic of that type, from a particular suspect application client and/or from the access terminal device 3 for some period of time.

The Security Agent software 5 also is configured to enable the SC 23 or the like to verify that the Agent is present and meets network security standards. For example, the Agent software may have a version number. When the AT registers with the network, the AT sends the version number of the Security Agent software 5, and the SC receives that number. The presence of the version number indicates that the Security Agent software 5 is present and enabled in the AT; and the software version number allows the SC to determine if the Security Agent software 5 is sufficiently up to date. If the Security Agent software 5 is present, and the version level is acceptable, the SC 23 authenticates the device 3 for communications through the network 1, e.g. by completing L3 registration of the device.

The Security Agent software 5 of the network Operator must be entirely tamper resistant. Typically, it will be separate from other parts of the software of the AT. In a laptop, the Security Agent software 5 will reside on the air-card, rather than the laptop memory, because the user typically has access to the laptop memory. Other security software, e.g. for the user's protection, would normally be separate. In the laptop example, a personal firewall implemented at the application layer 69 would protect the device from harmful traffic coming from the network and would reside in a normal manner on the memory device(s) of the laptop.

If there are network operators that do not enforce security, for example against attacks on the wireless networks or against spyware, etc., then devices of customers of such operators will not have adequate security software for operation on the network 1, e.g. when the users of such devices roam into service areas or attempt to connect to the network 1. The Operator of network 1 will not want such untrusted devices operating on the network 1.

Particularly for wireless service, the Operator of network 1 will have agreements with other operators/service providers under which customers of the other operators may roam-in and use the network 1, whereas customers of the Operator of network 1 may roam-out and use the networks of the other operators/service providers. Under such agreements, the Operator of network 1 will learn of the types of security mechanisms that the other operators/service providers have implemented on the various types of AT devices used by their customers. For example, if there are ten security mechanisms that may be available, newer AT devices of one service provider may implement eight to ten of those mechanism, whereas older AT devices or devices of another service provider may implement only two of the security mechanisms to block harmful traffic entering the network. The registration procedure allows the SC 23 to identify a roaming device and determine presence and type of Agent. Under the relevant agreements between the operators/service providers, the network 1 may limit or block traffic from devices that do not implement a sufficient set of the established security mechanisms, such as for the AT devices that implement only two of the security mechanisms in our example. In an example that limits service, the network 1 may provide basic voice call service but not IP based service(s). Alternatively, the network 1 may implement other security mechanisms within the network itself, on traffic for such untrusted roaming respective AT devices.

The registration procedure captures information essentially to determine the number/type of security mechanisms that the respective AT device is enforcing, to insure protection of the network 1. The SC then determines how the network 1 will treat communications for the AT device.

Consider a mobile AT device $3_2$, by way of example. The mobile AT device $3_2$ has an ESN number hard coded into the device. The mobile AT device $3_2$ may be assigned a MIN or other form of network based identification, when the Operator initially provisions the device; and the MIN or the like is programmed into memory of the mobile AT device $3_2$. When the device registers, the mobile AT device $3_2$ includes the ESN and its MIN in one or more of the registration signaling messages it sends to the network 1. In the normal manner, the network 1 uses this information to determine if the particular mobile AT device $3_2$ is a valid device. As discussed more later, the exemplary network 1 registers the device at a number of levels, e.g. L2 and L3. One or more of the registration/validation procedures provides the device identification to the SC. Hence, the ESN also may serve as an identifier for use in the verification of the Security Agent software 5 on the particular AT device 3.

In the example, when the device has been authenticated at layer two (L2) as a valid device, then the AT device 3 will attempt authentication at layer three (L3). The L3 authentication also allows the SC 23 to determine whether or not the AT device 3 is implementing a Security Agent which is adequate to protect the network against malicious traffic. There are a number of ways for the SC to make this determination, two of which are discussed here by way of examples.

A first example relies on explicit L3 mechanisms. The SC expects that the signaling messages for L3 authentication will provide the software version number to the Sc. For example, if the mobile AT device $3_2$ does not send the version number in the signaling messages during its attempt to register at layer three (L3), the SC knows that the AT device $3_2$ does not have or is not currently running a Security Agent.

The other exemplary approach is implicit: determination of presence and/or adequacy of a Security Agent relies on a database lookup. The carrier would maintain a database of records for the ATs of its customers listing the version of Security Agent software running in each device and possibly providing additional data as to levels/types/features supported by each agent. The database would include the ESNs of the ATs, to allow accessing records based on ESNs. The SC 23 should have access to the database, and the SC could have a signaling link to other carrier's equipment to access similar information for AT devices of roaming users. The AT sends its ESN to the network in the L2 signaling messages. The ESN is forwarded to the SC, which can ascertain the software version in conjunction with the database. As part of its processing, the SC 23 would access the appropriate database record using the ESN of the AT device obtained from the L2 signaling messages, to look up the software version information and/or information as to the security features implemented by the Security Agent software currently running in the particular AT device 3.

In any case, if the Security Agent software is adequate, then the SC indicates a successful authentication of the mobile AT device $3_2$, and the SC causes the network 1 to proceed in a normal manner to provide communications services for the mobile AT device $3_2$. If there is no version number received or if the SC determines that the resident Security Agent software will not enforce sufficient security mechanisms within the mobile AT device $3_2$, then the SC 23 causes the network 1 to block or limit service to the device or to take other measures to enforce security within the network 1.

Although referred to as a version number, those skilled in the art will recognize that the information about the Security Agent software 5 from the AT 3 can take any form that is sufficient to provide information about the Security Agent software to allow the SC or the like to determine if the software implements an adequate level of security. The version specific data might comprise data identifying the name/type of the security programming and an edition number, the name/type of the security programming and date of issue of the programming, etc. The version specific data could include a list of security mechanisms that the software currently implements or a list of such security mechanisms and respective versions or dates, however, typically the data is more limited and the SC uses the received data to look up more the detailed information in a mapping table or the like stored as part of its security database.

For AT devices 3 of customers of the Operator of network 1, the network may also implement a mechanism to update or otherwise upgrade the Security Agent software. Software push mechanisms are known today. In the illustrated network, the SC would interact with a push server 25 or other mechanism to push an upgrade (e.g. an update or a better replacement version) to an AT device of a customer of the Operator, when the SC determines from the Security Agent version information that the resident version of the Security Agent software is outdated and an upgrade to enhance network security is available.

Figure 4:
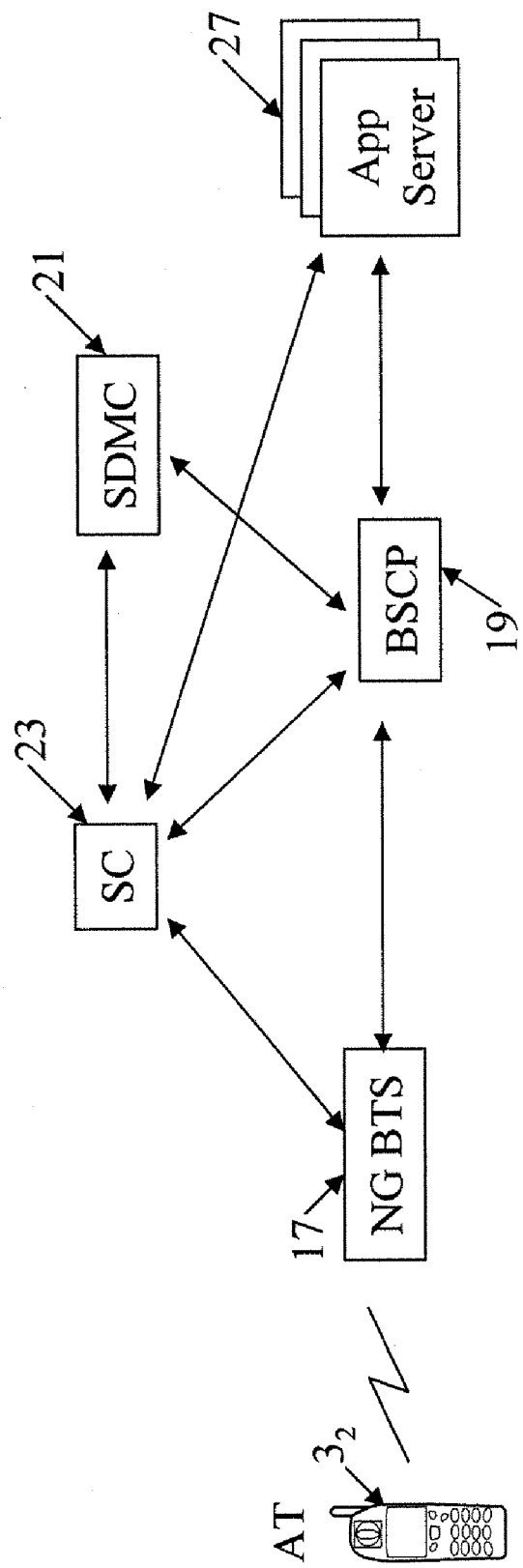
FIG. 4 is a network diagram similar to FIG. 1 but showing a selected portion of the network, for purposes of discussion of exemplary call flows.

The discussion of FIG. 1 provided a high level over-view of the architecture of a network 1 and the security functions provided in such a network 1. It may be helpful to consider those functions in the context of exemplary call or signal flows, and for the purposes of discussing such examples, it may be helpful to consider a more limited portion or version of the network. FIG. 4 is a simplified functional block diagram of elements of native IP network, which may implement the security functions under consideration here. Although the network architecture, and the security functions, are access agnostic, for purposes of discussion, it will be assumed that the network of FIG. 4 provides IP packet communication services and application services that utilize IP packet transport to wireless AT devices, many of which are mobile. Hence, the more limited diagram of FIG. 4 shows the mobile handset type AT device $3_2$, the NG BTS 17, the BSCP 19, the SDMC 21, the SC 23, and one or more application servers 27. These elements are similar to those discussed above relative to FIG. 1. Hence, for purposes of the call flows, the communications of the one exemplary mobile AT 3₂ go through the NG BTS 17, so the AGW, RNC/BTS, Ntwk AP and Wi-Fi AP of FIG. 1 are omitted, to simplify the illustration and the attendant discussion. Those skilled in the art will recognize, however, that similar processing would be implemented for security on communications for ATs accessing the networks via the RNC/BTS, the Wi-Fi AP or the Ntwk AP.

Call flows for the following scenarios are provided.

Scenario #1: When an Operator-hosted service is invoked

Figure 5:
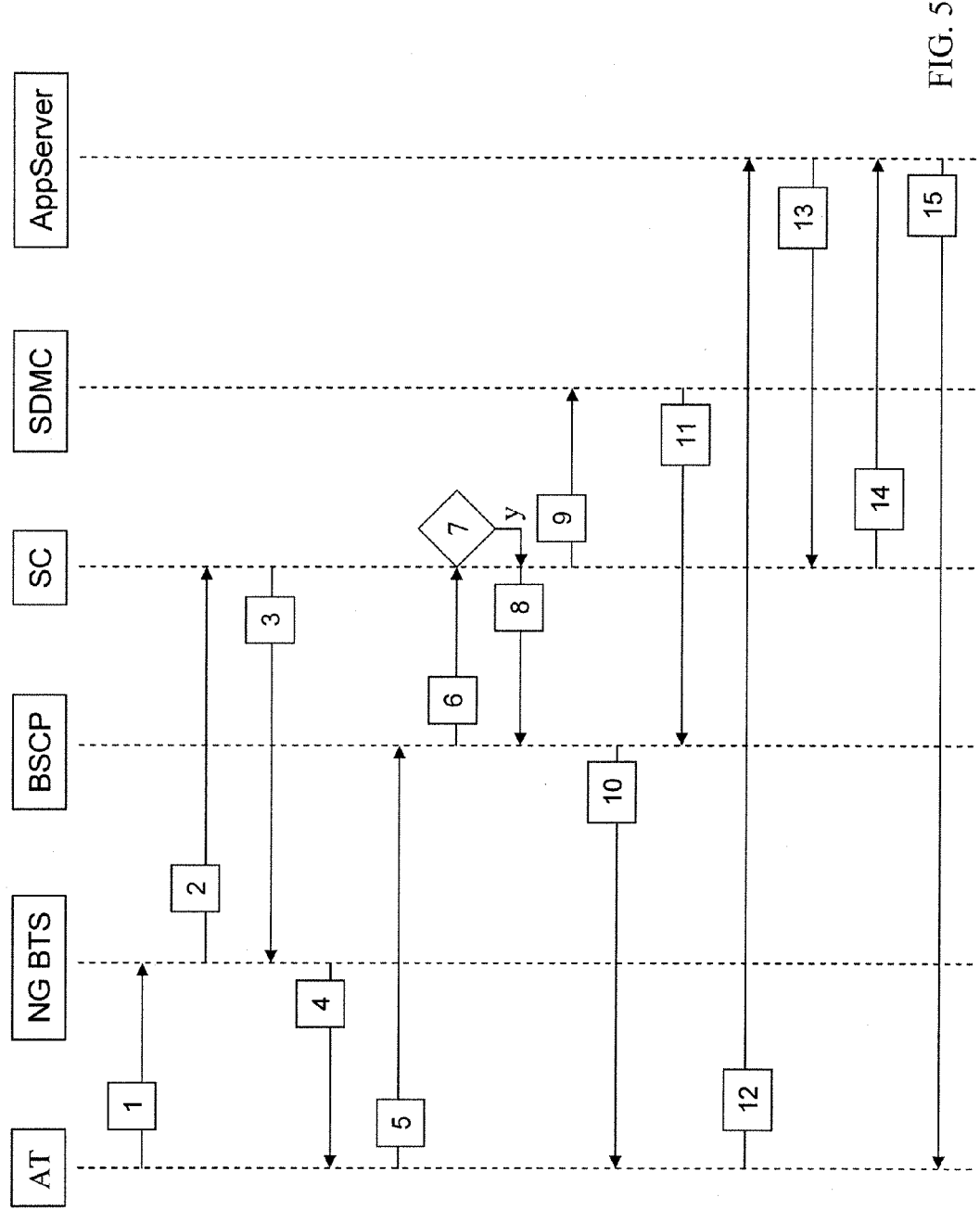
FIGS. 5-7 are call flow diagrams illustrating examples of communications through the network of FIG. 4, with security procedures as discussed herein.

Scenario #2: When a partner-hosted service with shared security credentials is invoked Scenario #3: When non-partner hosted service or partner-hosted service with non-shared security credentials is invoked FIG. 5 is a flow diagram of an example in which a subscriber who is not yet registered in the Operator network 1 invokes an Operator-hosted service. Assume for this first example that the Security Agent software 5 on the particular AT device 3 is a current version that is acceptable to the Operator. Also, the AT device in question is that of a customer (not a roamer), for simplicity. Table 1 below lists the steps in the call flow of FIG. 5.

TABLE 1

Steps in Call Flow When a Subscriber who is not registered invokes an Operator-Hosted service - Software Security Agent Version is adequate (FIG. 5)

| Step # | Description |
|---|---|
| 1 | AT registers with NG BTS at link layer |
| 2 | NG BTS sends a Layer 2 authentication request to the SC |
| 3 | SC sends message to NG BTS authenticating the device at Layer 2 |
| 4 | NG BTS authenticates AT |
| 5 | AT registers with BSCP at Layer 3 (sends Security Agent Version no.) |
| 6 | BSCP sends Layer 3 device authentication request to the SC (with Security Agent Version no.) |
| 7 | SC verifies the status of operator specific software on the device |
| 8 | SC sends message to BSCP authenticating the device at Layer 3 |
| 9 | SC sends message to SDMC about authenticated device |
| 10 | BSCP authenticates the device at Layer 3 and allocates IP address BSCP authenticates the user of the device as well NG BTS allocates link layer resources to the AT |
| 11 | SDMC sends services profile for the device to BSCP BSCP delivers any subscribed 'push' services to the device |
| 12 | AT invokes an Operator-hosted service |
| 13 | Application Server requests user authentication from SC |
| 14 | Since user is already authenticated in step 9, SC sends message to Application Server |
| 15 | Application Server provides service to user on specific device |

The example utilized a version number transmitted from the AT device to the SC, to verify the Security Agent software. As noted earlier, the SC could alternatively use a database lookup to determine the version number.

The above mechanisms use explicit L2 and L3 authentication mechanisms. The operator can choose to implement L2 and L3 authentication in a shared mode.

In the process outlined above, it was assumed that the mobile AT device provided the information regarding its Security Agent software, e.g. the Security Agent version number in step 5 and the BSCP forwarded that information to the SC in the next step. However, if the AT device is that of a user that has roamed into the territory of network 1, other procedures for obtaining this information may be necessary. For example, in some cases, the SC may obtain credentials for the security software from the other operator that normally services the roaming user's AT, e.g. using procedures similar to those used for AAA today such as proxy AAA, AAA Clearing Houses, etc. Alternatively, the other operator may provide the information for storage in the SC database under the applicable roaming agreement, for lookup based on ESN or the like, or the data may be provided as Federated Security Data.

In the process of FIG. 5 it was assumed that the mobile AT device had an adequate Security Agent software running on the device. Hence, the SC successfully verified the status of operator specific software on the device (yes result of step 7). However, if the Security Agent software running on the device is initially deemed to be inadequate, the SC might initiate a software push to download an appropriate upgrade to the device. The SC verification at layer three would fail if the upgrade is unsuccessful, much as it might if the layer three verification fails for some other reason. Assuming that the push upgrade process completes successfully, then the SC would successfully verify the status of operator specific software after the push operation (step 7), and processing would proceed to step 8 as in the drawing and in the table above.

Figure 6:
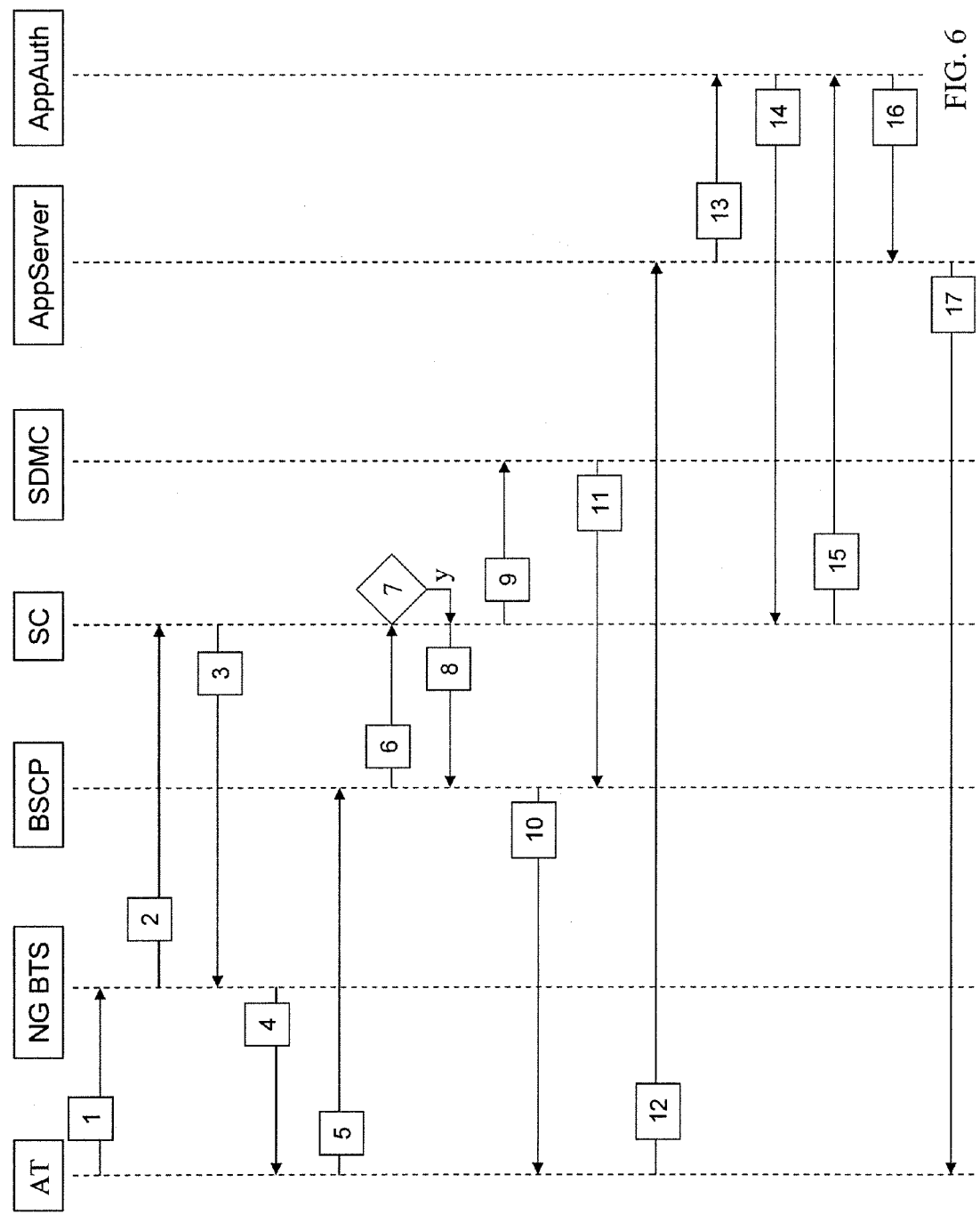

FIG. 6 is a flow diagram of an example in which a subscriber who is not yet registered in the Operator network invokes a partner-hosted service with shared security credentials. Table 2 below lists the steps in the call flow of FIG. 6.

TABLE 2

Steps in Call Flow When a Subscriber who is not registered invokes a Partner-Hosted service that shares security credentials with Operator (FIG. 6)

| Step # | Description |
|---|---|
| 1 | AT registers with NG BTS at link layer |
| 2 | NG BTS sends a Layer 2 authentication request to the SC |
| 3 | SC sends message to NG BTS authenticating the device at Layer 2 |
| 4 | NG BTS authenticates AT |
| 5 | AT registers with BSCP at Layer 3 (sends Security Agent Version no.) |
| 6 | BSCP sends Layer 3 device authentication request to the SC (with Security Agent Version no.) |
| 7 | SC verifies the status of operator specific software on the device |
| 8 | SC sends message to BSCP authenticating the device at Layer 3 |
| 9 | SC sends message to SDMC about authenticated device |
| 10 | BSCP authenticates the device at Layer 3 and allocates IP address BSCP authenticates the user of the device as well NG BTS allocated link layer resources to the AT |
| 11 | SDMC sends services profile for the device to BSCP BSCP delivers any subscribed 'push' services to the device |
| 12 | AT invokes an partner-hosted service |
| 13 | Application Server sends message to Application Authentication Server (AppAuth) requesting user authentication |
| 14 | AppAuth Server contacts SC for shared security credentials |
| 15 | SC validates user authentication |
| 16 | AppAuth Server sends message to App Server authenticating user |
| 17 | Application Server provides service to user on specific device |

Again, the illustration and the list of steps in the preceding table assumes that the AT device was a device of a customer of the Operator of the network 1 and that the device had an adequate Security Agent software running on the device. Although not shown for simplicity, the method of FIG. 6 would typically implement additional steps/processes to handle roaming ATs of users served by other network operators. The processing may also implement steps, under certain circumstances, to enable a software push to the AT if the SC initially determines that the Security Agent software is not adequate. Also, the version verification could rely on an ESN based version lookup instead of requiring the AT to actually send the version number.

Figure 7:
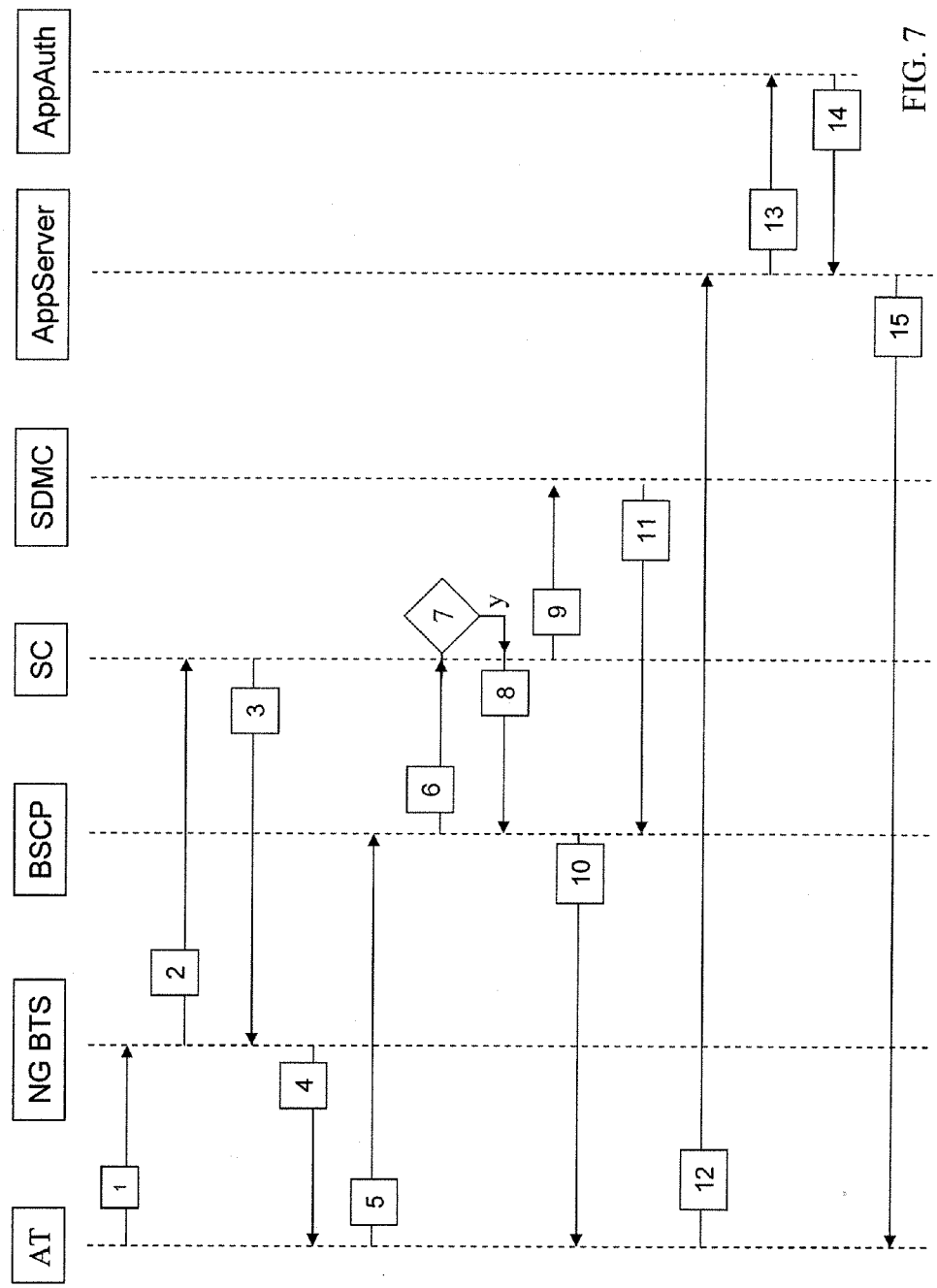

FIG. 7 is a flow diagram of an example in which a subscriber who is not yet registered with Operator network invokes a non-partner-hosted service or an Operator-partner service that does not share security credentials with the Operator. Table 3 below lists the steps in the call flow of FIG. 7.

TABLE 3

Steps in Call Flow When a Subscriber who is not registered invokes a Non-Partner-Hosted service or an Operator-Partner service that does not share security credentials with the Operator (FIG. 7)

| Step # | Description |
|---|---|
| 1 | AT registers with NG BTS at link layer |
| 2 | NG BTS sends a Layer 2 authentication request to the SC |
| 3 | SC sends message to NG BTS authenticating the device at Layer 2 |
| 4 | NG BTS authenticates AT |
| 5 | AT registers with BSCP at Layer 3 (sends Security Agent Version no.) |
| 6 | BSCP sends Layer 3 device authentication request to the SC (with Security Agent Version no.) |
| 7 | SC verifies the status of operator specific software on the device |
| 8 | SC sends message to BSCP authenticating the device at Layer 3 |
| 9 | SC sends message to SDMC about authenticated device |
| 10 | BSCP authenticates the device at Layer 3 and allocates IP address BSCP authenticates the user of the device as well NG BTS allocates link layer resources to the AT |
| 11 | SDMC sends services profile for the device to BSCP BSCP delivers any subscribed 'push' services to the device |
| 12 | AT invokes a service |
| 13 | Application Server requests user authentication from its own Application Authentication Server |
| 14 | AppAuth Server authenticates the user |
| 15 | Application Server provides service to user on specific device |

Again, the illustration and the list of steps in the preceding table assumes that the AT device was a device of a customer of the Operator of the network 1 and that the device had an adequate Security Agent software running on the device. Although not shown for simplicity, the method of FIG. 7 would typically implement additional steps/processes to handle roaming ATs of users served by other network operators. The processing may also implement steps, when appropriate, to enable a software push to the AT if the SC initially determines that the Security Agent software is not adequate. Also, the version verification could rely on an ESN based version lookup instead of requiring the AT to actually send the version number.

As shown by the discussion above, aspects of the network security technology are implemented by execution of software, firmware, or microcode running on a computer or other platform operating as a node of the network, such as the SC 23; and other aspects of the technology are implemented by software running as the Security Agents 5 on the various AT devices 3. The code and/or associated data forming the software for the security functions may be effectively "burned-into" non-volatile storage to convert it to firmware.

Hence, operations described above may be carried out by execution of programming code in the form of software, firmware, or microcode running on computers or other programmable processor devices of any type and/or by processing of relevant data on such programmable devices. The software functionalities involve programming, including executable code as well as associated stored data, for causing the respective network platform or AT device 3 to implement the security related functions, as exemplified by the discussions above. Code for implementing the security operations may be in the form of computer instruction in any form (e.g. source code, object code, interpreted code, etc.) stored in or carried by any computer or machine-readable medium. In operation, the executable code and in some cases associated data are stored within the respective network platform or AT device 3. At other times, however, the programming and/or data may be stored at other locations and/or transported for loading into respective equipment, e.g. into the SC platform or into an AT 3 from the push server 25 or the like. Hence, implementations of the teachings presented herein typically involve one or more software products in the form of one or more modules of executable code and/or data carried by at least one machine readable storage medium. Execution of such code and/or processing of the relevant data by a processor or the like of a network platform for example, enables the platform to perform the relevant SC functions. Similarly, execution of such code and/or processing of data by a processor or the like of an AT device 3 causes that device to perform the Security Agent functions and to verify presence and version number of the Security Agent with the SC as discussed above.

As used herein, terms such as computer or machine "readable storage medium" refer to any storage medium that participates in providing instructions and/or data to a processor. Such a medium may take many forms, including but not limited to, non-volatile storage media and, volatile media. Non-volatile storage media include, for example, optical or magnetic disks, such as storage devices in any AT or computer (s), switches or routers operating as the SC. Volatile storage media include dynamic memory, such as main memory of an AT or SC platform or other computer platform. Many of these forms of computer readable media may be involved in carrying one or more sequences of one or more instructions to a processor for storage and/or execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

AP—Access Point
AT—Access Terminal
BREW—Binary Runtime Environment for Wireless
BSCP—Bearer Services Control Point
BTS—Base Terminating Station
DRM—Digital Rights Management
EIR—Equipment Identity Register
ESN—Electronic Serial Number
EVDO—Evolution Data Optimized
HLR—Home Location Register
IMS—IP Multimedia Subsystem
IP—Internet Protocol
KDC—Key Distribution Center
MIN—Mobile Identification Number NG BTS—IP based Next Generation Base Terminating System
PC—Personal Computer
PDA—Personal Digital Assistant (PDA)
RAM—Random Access Memory
RNC—Radio Network Controller
SC—Security Center
SDB—Subscriber service Database
SDMC—Services Data Management Center
SIP—Session Initiation Protocol
Wi-Fi—Wireless Fidelity (IEEE 802.11)

What is claimed is:

1. A platform configured as a node of a communications network for controlling the network layer (Layer 3) service through the communications network, the platform comprising:
an interface for communication through the network;
a processor, coupled to the interface;
a storage device accessible by the processor; and
programming stored in the storage device for the processor, wherein execution of the programming by the processor configures the platform to perform functions, including functions to:
receive, through the communications network, a message relating to a request for registration of an access terminal device for network layer (Layer 3) service through the communications network, the message including data regarding a security agent that is enabled in the access terminal device,
wherein the security agent is configured to protect the communications network by blocking malicious traffic generated by an application program in the access terminal device from entering the communications network from the access terminal device;
determine adequacy of the security agent to protect the communications network against malicious traffic in response to the data regarding the enabled security agent;
grant the requested registration for network layer (Layer 3) service for the access terminal device through the communications network, in response to the determined adequacy of the enabled security agent to protect the communications network against malicious traffic, and
receive a communication through the communications network, responsive to grant of the requested registration by the node of the communications network upon determining the adequacy of the security agent to protect the communications network against malicious traffic;
wherein during the communication through the network, the security agent is executed to:
monitor activity of the access terminal device and identify traffic generated by the application program in the access terminal device as malicious, and
prevent the application program in the access terminal device from sending the identified malicious traffic from the access terminal device into the communications network.

2. The platform of claim 1, wherein execution of the programming by the processor configures the platform to perform further functions, including functions to:
receive, through the communications network, another message relating to a request for registration of another access terminal device for network layer (Layer 3) service through the communications network, the other message including data regarding a security agent that is enabled in the other access terminal device;
determine inadequacy of the security agent in the other access terminal device to protect the communications network against malicious traffic, in response to the data regarding the security agent in the other access terminal device; and
implement at least one network security measure in relation to communication of the other access terminal device through the communications network, responsive to the determined inadequacy of the security agent in the other access terminal device.

3. The platform of claim 2, wherein the at least one network security measure comprises restricting communications of the other access terminal device through the communications network.

4. The platform of claim 2, wherein the at least one network security measure comprises blocking communication of the access terminal device through the communications network.

5. An access terminal device, comprising:
an interface for communication through a communications network;
a processor, coupled to the interface;
a storage device accessible by the processor; and
programming stored in the storage device for the processor, including a security agent, wherein:
the security agent is configured to protect the communications network by blocking malicious traffic generated by an application program in the access terminal device from entering the communications network from the access terminal device, and
execution of the programming by the processor configures the access terminal device to perform functions, including functions to:
send a message relating to a request for registration of the access terminal device for network layer (Layer 3) service through the communications network, to a node of the communications network controlling the network layer (Layer 3) service through the communications network, the message including data regarding the security agent to enable the network node to determine adequacy of the security agent to protect the communications network against malicious traffic;
communicate through the communications network, responsive to grant of the requested registration by the node of the communications network upon determining the adequacy of the security agent to protect the communications network against malicious traffic; and
during the communication through the network, execute the security agent to:
monitor activity of the access terminal device and identify traffic generated by the application program in the access terminal device as malicious, and
prevent the application program in the access terminal device from sending the identified malicious traffic from the access terminal device into the communications network.

6. The access terminal device of claim 5, further comprising:
a secure storage area assigned to an operator of the communications network, within the storage of the access terminal device;
wherein the security agent comprises executable software loaded into the secure storage area.

7. The access terminal device of claim 5, wherein the function to execute the security agent comprises functions to:
obtain credentials from applications running on the access terminal device; and recognize from the credentials the application program as an application of a type capable of generating malicious traffic;

wherein the function to prevent comprises preventing any traffic from the recognized application program from being transmitted from the access terminal device to the communications network.

8. The access terminal device of claim 5, wherein the functions to monitor and prevent implement a reverse firewall to filter out malicious traffic generated by any applications running on the access terminal device.

9. A product comprising a non-transitory machine readable medium and programming embodied in the medium, wherein said programming is for causing an access terminal device configured for communicating through a communications network to implement a method of communicating through the communications network in a manner to insure security for the communications network, comprising:

enabling a security agent in the access terminal device, wherein the security agent is configured to protect the communications network by blocking malicious traffic generated by an application program in the access terminal device from entering the communications network from the access terminal device;

sending a message relating to a request for registration of the access terminal device for network layer (Layer 3) service through the communications network, to a node of the communications network controlling the network layer (Layer 3) service through the communications network, wherein the message includes data regarding the security agent in the access terminal device to enable the network node to determine adequacy of the security agent to protect the communications network against malicious traffic;

if the node of the communications network grants the requested registration in response to the data regarding the enabled security agent based upon determined adequacy of the security agent to protect the communications network against malicious traffic, communicating through the communications network; and during the communicating through the communications network, implementing the security agent for:

monitoring activity of the access terminal device and identify traffic generated by the application program in the access terminal device as malicious, and preventing the application program in the access terminal device from sending the identified malicious traffic from the access terminal device into the communications network.

10. The product of claim 9, wherein the implementing of the security agent comprises:

obtaining credentials from applications running on the access terminal device; and recognizing from the credentials the application program as an application of a type capable of generating malicious traffic;

wherein the preventing comprises preventing any traffic from the recognized application program from being transmitted from the access terminal device to the communications network.

11. The product of claim 9, wherein the implementing of the security agent comprises implements a reverse firewall to filter out malicious traffic generated by any applications running on the access terminal device.

* * * * *